Dec. 28, 1965   J. L. BLOOM   3,226,547
THERMAL NEUTRON FLUX MEASURING DEVICE
USING TWO BORON THERMISTORS
Filed July 10, 1962

INVENTOR.
JUSTIN L. BLOOM
BY
*Robert S. Berger*
ATTORNEY.

United States Patent Office 3,226,547
Patented Dec. 28, 1965

3,226,547
THERMAL NEUTRON FLUX MEASURING DEVICE USING TWO BORON THERMISTORS
Justin L. Bloom, Timonium, Md., assignor to Martin-Marietta Corporation, Baltimore, Md., a corporation of Maryland
Filed July 10, 1962, Ser. No. 208,768
10 Claims. (Cl. 250—83.1)

This invention relates to neutron flux detection and, more particularly, to a device and method whereby instantaneous measurements of neutron flux are obtained with a high degree of sensitivity.

Before the power output of a nuclear reactor can be properly controlled, it is necessary that an accurate measurement of reactor power output be available. Since the thermal neutron flux within the core of the reactor is indicative of the unit's power output, it has been common practice to determine the power output by measuring the thermal neutron flux being generated. However, devices heretofore devised for such purposes have certain inherent limitations which adversely affect their ability to provide measurements sufficiently accurate to permit precision control of nuclear reactor operations. This invention provides a more accurate measurement than heretofore obtainable of the thermal neutron flux in the core of the reactor, thereby permitting better control of reactor power outputs.

Probably the most widely used method for determining neutron flux has been to insert a wire formed of material such as cobalt, which has a high thermal neutron absorbing characteristic, into the core of the reactor. After a known period of time the wire is removed from the core and its degree of radioactivity determined by a radiation counter. An average of the neutron flux to which the wire was exposed while in the reactor can then be calculated. This method of measuring neutron flux has the obvious disadvantage of not providing instantaneous measurements.

Another method of measuring neutron flux frequently employed is to locate a tank containing boron trifluoride in the vicinity of, but external to, the reactor. As the neutron flux passes through the boron trifluoride, ions of helium-4 and lithium-7 will be generated. Suitable means are then employed to measure the ionization current which is representative of the neutron flux in the core of the reactor. The accuracy of this method of neutron flux measurement is severely limited by the fact that it is not a direct measurement of the flux present in the core of the reactor. Miniaturized ionization chambers which have been designed for insertion into the reactor core are limited to low neutron flux, short life applications.

It has also been proposed to suspend a subcritical mass of fissionable uranium between wires of dissimilar metals. The free ends of the dissimilar metal wires would be connected to wires formed of a third metal. When this device is inserted into the core of a nuclear reactor, thermal neutrons striking the uranium would cause fissions therein, thereby heating the uranium junction between the dissimilar metals and developing a thermoelectric potential between these two wires, which would be a measure of the neutron flux striking the junction. Another form of neutron flux measuring device which has been proposed is one utilizing two thermo-sensitive resistance elements. The first of these elements is coiled on a small strip of fissionable uranium of subcritical mass, while the second is coiled on a strip of glass. Thermal neutrons striking the uranium strip will cause fissions therein, thereby generating heat and consequently changing the ohmic resistance of its associated resistive element. The difference between the resistances of the two resistive elements would be a measure of the thermal neutron flux to which they are exposed. However, the sensitivity of these two forms of neutron flux measuring devices is relatively poor when compared to that provided by the device of the present invention.

It is therefore the principal object of the present invention to provide an extremely sensitive thermal neutron flux measuring device. The device provided permits direct and instantaneous thermal neutron flux measurements to be made. Another object of this invention is to provide a small neutron flux measuring device having a relatively long operating life. In addition a method is provided for accurately measuring the thermal neutron flux within the core of a nuclear reactor. These and other objects and advantages of this invention will become apparent as the following description is read in connection with the accompanying drawings in which:

Both intrinsic and doped boron exhibit a marked inverse function of electrical resistivity with temperature, the undoped material presenting an almost straight line relationship between the logarithm of its resistivity and the reciprocal of the temperature to which it is exposed from room temperature to 2000° C. The logarithm of intrinsic boron's resistivity in this temperature range varies from $10^{-3}$ to $10^6$ ohm-centimeters. This property of elemental boron makes both its intrinsic and doped forms extremely useful in high sensitivity high temperature thermistors.

It is well known that, upon absorbing a neutron, the isotope $B^{10}$ of boron will break into charged particles of helium and lithium, thereby generating a significant amount of heat. The device provided makes use of this phenomenon to obtain an accurate measurement of thermal neutron flux by employing two boron thermistors, one comprising a greater amount of the isotope $B^{10}$ than the other. When exposed to a field of thermal neutrons, the temperature of the former will exceed that of the latter by an amount proportionable to the magnitude of the neutron flux in which they are located and, consequently, the difference between the resistances of the two thermistors will represent a measurement of the intensity of that field.

Figure 1:
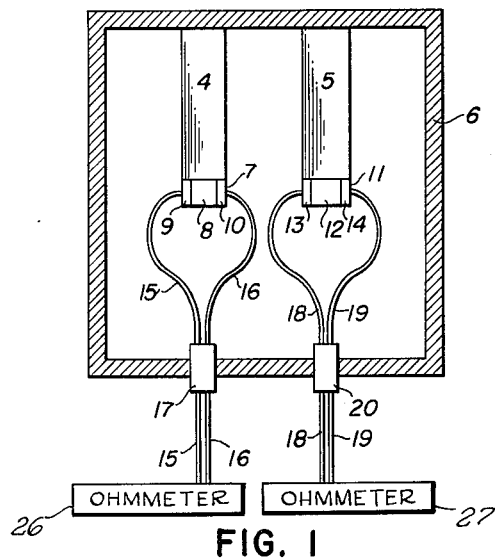
FIGURE 1 is a diagrammatic view of a device arranged and constructed in accordance with the principles of the present invention.

Referring first to FIGURE 1, a pair of stand-off insulators 4 and 5 are mounted in spaced relationship to the inside surface of an encapsulating can 6. These stand-off insulators 4 and 5 must withstand reactor core operating temperatures and, consequently, are preferably formed from a high temperature ceramic. The encapsulating can 6 will be exposed to the same high operating temperatures and may be formed from aluminum, stainless steel, a ceramic or any other suitable low neutron absorbing material. Mounted to the free ends of the stand-off insulator 4 is a boron thermistor 7. As may be better seen by reference to FIGURE 2, the boron thermistor 7 consists of a small block of single crystal boron 8 highly enriched in the isotope $B^{10}$ with metallic conducting plates 9 and 10 attached to two opposite faces thereof.

Mounted to the free end of the stand-off insulator 5 is a boron thermistor 11 which, like the thermistor 7, consists of a small block of single crystal boron 12 having metallic conducting plates 13 and 14 attached to two opposite faces thereof. The two thermistors 7 and 11 are similar in construction except that the block of boron 8 in the former contains a greater percentage of the isotope $B^{10}$ than does the block of boron 12 in the latter.

The conducting plates 9, 10, 13 and 14 may be formed of any high melting point relatively low neutron absorbing material, such as platinum or copper which will form a good electrical bond with boron, and may be attached to the blocks of boron 8 and 12 by vapor deposition or flame spraying techniques. Lead wires 15 and 16 are welded or brazed to the conducting plates 9 and 10, respectively, of the boron thermistor 7. These lead wires 15 and 16 extend through a ceramic lead-through 17 suitably provided in the encapsulating can 6. Similarly lead wires 18 and 19 are welded or brazed to the plates 13 and 14, respectively, of the boron thermistor 11 and extend through a ceramic lead-through 20 suitably provided in the encapsulating can 6. The free ends of the lead wires 15, 16, 18 and 19 are connected to ohmmeters 26 and 27, respectively, or to a resistance bridge (not illustrated) in a manner permitting the difference between the resistances of the boron thermistors 7 and 11 to be determined.

Although differing in the percentages of concentration, both of the boron thermistors 7 and 11 will contain some amount of the isotope $B^{10}$. Consequently, the thermistor 11 as well as the thermistor 7 will absorb a number of thermal neutrons when exposed to a field thereof, thereby causing a limited amount of heat to be generated therefrom. In addition, the sensitivity of the two boron thermistors 7 and 11 to ambient temperatures may vary. For these reasons, the resistivity-temperature characteristic of the two boron thermistors 7 and 11 should be calibrated in known neutron flux and ambient temperature environments prior to being placed in operation. Preferably, the thermistors 7 and 11 are calibrated after being mounted within the encapsulating can 6. In production runs it naturally will be only necessary to perform one calibration operation for each particular type of flux measuring device produced.

The neutron flux measuring device herein provided is then placed in the environment, such as the core of a nuclear reactor, whose neutron flux is to be measured. The resistivity of the two boron thermistors 7 and 11 will be similarly affected by the ambient temperature of the reactor core, by the heat generated from gamma radiation and by the heat generated as a result of bombardment by sub-atomic particles other than neutrons. The resistivity of the thermistor 11 will be relatively unaffected by neutron bombardment. However, thermal neutrons striking the boron thermistor 7, which is relatively highly enriched in the isotope $B^{10}$, will be absorbed thereby resulting in a marked increase in the temperature thereof and a consequent resistivity change therein. The resulting difference between the resistances of the boron thermistors 7 and 11 is readily ascertainable by the use of ohmmeters 26 and 27 and represents a measure of the neutron flux to which the device is exposed.

Depending upon the temperatures to be encountered, it may be desirable to evacuate the encapsulating can 6 and in some cases to fill the encapsulating can with an inert gas such as helium or argon in order to adequately protect the components contained therein from the harmful effects of corosion and to provide for the desired rate of heat transfer between the thermistors 7 and 11 and the walls of the encapsulating can. For operating temperatures up to 200° C. no special atmosphere will normally be required within the encapsulating can 6. Optimum results will usually be obtained when operating between 200° C. and 500° C. by use of an inert gas atmosphere. Above 500° C. best operating conditions will normally be provided when the encapsulating can 6 is either filled with an inert gas under reduced pressure or is in vacuo.

As previously indicated, it is necessary that the block of boron 8 of the thermistor 7 be composed of a greater percentage of the isotope $B^{10}$ than is contained by the block of boron 12 of the thermistor 11. Satisfactory results can be obtained if the proportion of the isotope $B^{10}$ in the block of boron 8 exceeds by from 17 to 94 percent the proportion of the isotope $B^{10}$ in the block of boron 12. However, greatest sensitivity is obtained when the proportion of isotope $B^{10}$ in the block of boron 8 approaches 96 percent while the proportion of the isotope $B^{10}$ in the block of boron 12 is reduced to approximately 2 percent. The amount of boron employed in the individual blocks of boron 8 and 12 will naturally vary depending on the sensitivity desired and the magnitude of neutron flux to be measured. In most cases each block of boron 8 and 12 will weigh from 1 to 100 milligrams. It is desirable that the blocks of boron 8 and 12 be of the same size and configuration in order that they will possess similar heat dissipating properties. Being of such small size, a number of similar devices may be installed at different locations within the core of the same reactor to obtain a map of the neutron flux being generated therein.

Figure 2:
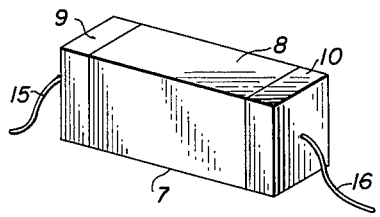
FIGURE 2 is a perspective view of an individual boron thermistor utilized in the particular embodiment of this invention illustrated in FIGURE 1.
Figure 3:
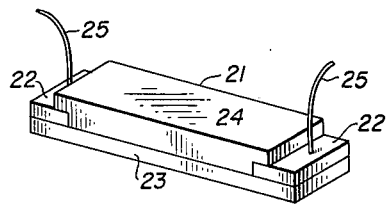
FIGURE 3 is a perspective view of an alternate form of boron thermistor which may be utilized in the thermal neutron-flux measuring device of the present invention.

In FIGURES 1 and 2 there is illustrated a form of boron thermistor which may be used in the device of the present invention. An alternate form of boron thermistor 21 suitable for use is illustrated in FIGURE 3 wherein a pair of metallic conducting plates 22 are first attached to a ceramic substrate 23 by vacuum deposition or flame spraying techniques. A layer of boron 24 is then vacuum deposited on the ceramic substrate 23 so as to form an electrical connection between the pair of metallic conducting plates 22. Brazed or welded to the metallic conducting plates 22 are lead wires 25.

This invention may be embodied and/or performed in other ways without departing from the spirit or essential characteristics thereof. The embodiments and process of the invention described herein are therefore to be considered as in all respects illustrative and not restrictive the scope of the invention being indicated by the appended claims, and all changes which come within the meaning and range of equivalency of the claims are intended to be embraced therein.

What is claimed is:

1. A thermal neutron flux measuring device comprising:
   (a) a pair of boron thermistors, the first of said thermistors being composed of a substantially greater proportion of the isotope $B^{10}$ than the second of said thermistors, thereby having a greater capability for absorbing thermal neutrons than said second thermistor; and
   (b) means for determining the difference between the electrical resistances of said pair of boron thermistors, said difference being a measure of the thermal neutron flux to which said pair of thermistors is exposed.

2. The device of claim 1 wherein the proportion of the isotope $B^{10}$ in said first thermistor exceeds by from 17 to 94 percent the proportion of the isotope $B^{10}$ in said second thermistor.

3. The device of claim 1 wherein the proportion of the isotope $B^{10}$ in said first thermistor exceeds by approximately 94 percent the proportion of the isotope $B^{10}$ in said second thermistor.

4. The device of claim 1 wherein said pair of boron thermistors are in vacuo.

5. The device of claim 1 wherein said pair of thermistors are enclosed within an inert gas environment.

6. A thermal neutron flux measuring device comprising:
   (a) an encapsulating can;
   (b) a first thermistor formed of boron including approximately 96 percent of the isotope $B^{10}$ and mounted within said encapsulating can;
   (c) a second thermistor formed of boron including approximately 2 percent of the isotope $B^{10}$ and mounted within said encapsulating can; and
   (d) means for determining the difference between the electrical resistances of said first and said second thermistors, said difference being a measure of the thermal neutron flux to which said first and said second thermistors are exposed.

7. The device of claim 6 wherein said first and said second thermistors are in vacuo.

8. The device of claim 6 wherein said first thermistor and said second thermistor are enclosed within an inert gas environment.

9. In a device for measuring thermal neutron flux the improvement comprising a first boron thermistor and a second boron thermistor, said first boron thermistor being composed of a substantially greater proportion of the isotope $B^{10}$ than said second boron thermistor whereby said first boron thermistor will absorb a greater amount of thermal neutrons than said second boron thermistor when said first and second boron thermistors are exposed to said thermal neutron flux.

10. The device of claim 9 wherein the proportion of the isotope $B^{10}$ in said first boron thermistor exceeds by from 17 to 94 percent the proportion of the isotope $B^{10}$ in said second boron thermistor.

References Cited by the Examiner
UNITED STATES PATENTS

| | | | |
|---|---|---|---|
| 2,564,626 | 8/1951 | MacMahon et al. | 250—83.1 |
| 3,086,117 | 4/1963 | Klein et al. | 250—83.1 |
| 3,137,792 | 6/1964 | Staples et al. | 250—83.1 |

RALPH G. NILSON, *Primary Examiner.*

ARCHIE R. BORCHELT, *Assistant Examiner.*